US006730361B2

(12) United States Patent
Parekh et al.

(10) Patent No.: US 6,730,361 B2
(45) Date of Patent: May 4, 2004

(54) METHOD OF COATING A PACKAGING CONTAINER USING CROSSLINKABLE POLYESTER-POLYURETHANE

(75) Inventors: Girish G. Parekh, Wexford, PA (US); Gregory M. Paulson, Slippery Rock, PA (US); Ronald L. Goodwin, Coraopolis, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 10/365,064

(22) Filed: Feb. 12, 2003

(65) Prior Publication Data

US 2003/0152778 A1 Aug. 14, 2003

Related U.S. Application Data

(60) Provisional application No. 60/356,835, filed on Feb. 12, 2002.

(51) Int. Cl.⁷ .................................................. B05D 3/02
(52) U.S. Cl. ................. 427/388.2; 427/392; 427/393.5; 427/421
(58) Field of Search .............................. 427/388.2, 392, 427/393.5, 421

(56) References Cited

U.S. PATENT DOCUMENTS

| 4,072,770 A | | 2/1978 | Ting | |
| 4,810,321 A | | 3/1989 | Wank et al. | |
| 5,077,373 A | | 12/1991 | Tsuda et al. | |
| 5,139,854 A | | 8/1992 | Johnson | |
| 5,143,788 A | | 9/1992 | Johnson | |
| 5,356,669 A | * | 10/1994 | Rehfuss et al. | 427/407.1 |
| 5,684,072 A | * | 11/1997 | Rardon et al. | 524/199 |
| 5,709,950 A | * | 1/1998 | Burgman et al. | 428/423.1 |
| 5,710,209 A | | 1/1998 | Blum et al. | |
| 5,723,552 A | * | 3/1998 | Menovcik et al. | 525/453 |
| 5,798,145 A | * | 8/1998 | Barancyk et al. | 427/393.5 |

FOREIGN PATENT DOCUMENTS

| EP | 919601 | * | 6/1999 |
| WO | WO 94/10211 | * | 5/1994 |
| WO | WO 00/37560 | * | 6/2000 |

* cited by examiner

*Primary Examiner*—Erma Cameron
(74) *Attorney, Agent, or Firm*—Michael A. Essien; Larkin, Hoffman, Daly & Lindgren, Ltd.

(57) ABSTRACT

The present invention provides a method of coating a packaging container with a coating composition having crosslinkable polyester-polyurethane polymer with at least two carbamate sites, and a crosslinker. The method includes coating a generally planar substrate with the coating composition, curing and forming a container or a portion of a container. The present invention also provides a coating composition and coated substrates.

24 Claims, No Drawings

METHOD OF COATING A PACKAGING CONTAINER USING CROSSLINKABLE POLYESTER-POLYURETHANE

RELATED APPLICATION

This application claims the benefit of a pending U.S. provisional application Serial No. 60/356,835, filed Feb. 12, 2002, which is herein incorporated by reference.

BACKGROUND

Coating solutions and coated materials of various kinds are used in the packaging industry. Some coatings serve to protect the exterior layer while some coatings serve as a barrier protecting the contents from contamination by the package itself. In other instances, the coatings are used as decorations or as advertisements. Each coating presents specific requirements at production in order to meet the demand of its intended use. For example, exterior packaging coatings need to be abrasion resistant and if messages are incorporated, the coatings should maintain the properties needed to communicate the information to the intended audience. In some instances, the packaging coating for the exterior of the package should be adaptable to accept other coatings. Other requirements are presented depending on the intended use of the package, such as image retention, weather resistance, and information dissemination.

Interior packaging coatings present other requirements for container packaging. Depending on its intended use, the coated package may be required to meet certain stringent requirements. For example, drug containers must meet very stringent requirements in order to prevent contamination of the drugs. As another example, containers that are used to package edible items such as food, beer and beverage must meet exacting standards. These requirements generally include excellent cure, excellent adhesion of the coating, blush resistance, retort resistance and corrosion resistance.

Most coatings are not formulated to meet these stringent requirements. For example, an automotive coating composition, while useful on a car, may not be useful as a coating for a food or beverage packaging container. It is a fair conclusion, therefore, that not all coatings can be used on package containers for food items.

Another consideration for food and beverage package coatings is cost. An effective coating should be cost effective while meeting the high performance requirements for food and beverage container coatings.

From the foregoing, it will be appreciated that what is needed in the art is a low cost, high performance coating that is easy to make and apply. Such coatings and methods for preparing and applying the same are disclosed and claimed herein.

SUMMARY

In one embodiment, this invention relates to novel methods of coating a packaging container. The method of the present invention includes the steps of providing a coating composition having a crosslinkable polyester-polyurethane polymer. The crosslinkable polyester-polyurethane polymer of the present invention preferably comprises at least two carbamate sites. The coating composition preferably also includes a crosslinker.

A suitable method of the present invention includes the steps of: coating on a generally planar substrate; curing the composition; and forming the substrate into a container (e.g., a packaging container) or a portion of a container.

In another preferred embodiment, this invention also relates to a coating composition including a crosslinkable polyester-polyurethane polymer having at least two carbamate sites, a crosslinker, and at least one adjuvant such as a carrier, a lubricant, a pigment, a rheological control agent, a flow control agent, or a combination thereof.

Another embodiment of the present invention includes a coated package comprising a substrate, a cured coating produced from a composition including a crosslinkable polyester-polyurethane polymer that has at least two carbamate sites, a crosslinker, and at least one adjuvant such as a carrier, a lubricant, a pigment, a rheological control agent, a flow control agent, or a combination thereof.

DETAILED DESCRIPTION

The present invention provides a novel method of coating a packaging container substrate using a crosslinkable coating composition. In addition, the present invention provides a new packaging coating and compositions usable in the food packaging industry.

The coating composition of the present invention preferably comprises a crosslinkable polyester-polyurethane polymer, a crosslinker, and may optionally further comprise at least one adjuvant such as: lubricants, pigments, rheological control agents, flow control agents, and solvents. A catalyst may also be utilized to enhance the cure of the coating composition. The coating composition of the present invention provides one or more features such as: excellent film integrity on applied packages, excellent ability to accept pigmentation, desired chemical stability, enhanced corrosion resistance, and/or required sterilization resistance.

Suitable crosslinkable polyester-polyurethane polymers ("PE-PU polymer") may be formed by reacting a polyester intermediate ("PE intermediate") with a polyisocyanate compound. Preferred PE-PU polymers of the present invention comprise two or more carbamate sites per polymer chain. Such carbamate sites are preferably suitable for crosslinking of the PE-PU polymer by crosslinkers, such as amino resins, phenolic resins, and/or blocked isocyanates.

In one embodiment, the PE intermediate is a hydroxy functional polyester containing hydroxy end groups and the polyisocyanate compound is an organic polyisocyanate. Suitable hydroxy functional polyesters include, for example, the reaction product of (i) a diol of the formula HOROH, where R is an aliphatic, cycloaliphatic, or aromatic hydrocarbon radical that has, preferably between 2 and 40 carbon atoms, more preferably between 2 and 20 carbon atoms, and most preferably between 2 and 12 carbon atoms; and (ii) a dicarboxylic acid of the formula $R'(COOH)_2$, or an anhydride of such an acid, where R' is an aliphatic, cycloaliphatic, or aromatic hydrocarbon radical having preferably 4 to 50 carbon atoms, more preferably 4 to 45 carbon atoms, and most preferably 4 to 40 carbon atoms.

Suitable PE-PU polymers of the present invention have a number average molecular weight ("$M_n$") of at least 5,000, preferably between 5,000 and 35,000, more preferably between 7,000 and 20,000, and most preferably between 9,000 and 15,000. Suitable PE-PU polymers of the present invention have a weight average molecular weight ("$M_w$") of at least 10,000, preferably between 10,000 and 40,000, more preferably between 14,000 and 30,000, and most preferably between 18,000 and 25,000.

Suitable PE-PU polymers of the present invention have a glass transition temperature ("$T_g$") of at least about 0° C., preferably at least about 50° C., more preferably between about 50° C. and 80° C., and most preferably between about 60° C. and 70° C.

Suitable PE-PU polymers of the present invention have a hydroxyl number (OH#) of less than about 5 mg/g, and preferably between 0 and 1 mg/g. The hydroxyl number of a hydroxyl-containing polymer of the present invention is determined by methods as are known in the art such as described in ASTM E-222-00, Test Method C.

The PE-PU polymers in the coating composition of the present invention are preferably present in an amount between about 10 and 100 weight percent, more preferably between about 50 and 100 weight percent, most preferably between about 70 and 95 weight percent of the coating composition.

As previously mentioned, suitable PE-PU polymers may be formed by reacting a polyester intermediate ("PE intermediate") with a polyisocyanate compound.

Suitable PE intermediates for use in the present invention include medium molecular weight, linear, hydroxy functional polyesters. Preferred PE intermediates have a number average molecular weight between about 1,000 and 10,000, more preferably between about 2,000 and 10,000, most preferably between about 4,000 and 8,000. The weight average molecular weight of the PE intermediates is preferably between about 2,000 and 25,000, more preferably between about 5,000 and 25,000, and most preferably between about 10,000 and 20,000. Preferably the hydroxyl number (OH#) of the PE intermediate is between 10 and 100, more preferably between 15 and 85, and most preferably between 20 and 50. Preferred PE intermediates have a glass transition temperature ("$T_g$") of at least about 0° C., more preferably at least about 20° C., and most preferably between about 40° C. and 80° C.

The hydroxy functional polyester may be formed by conventional techniques. In one embodiment, a diol and a di-acid are charged into a conventional polymerization vessel and reacted between about 150° C. to 240° C. for about 12 to 18 hours. Optionally, an esterification catalyst may be used to decrease the reaction time. For example, between about 1 and 1.2 equivalents of a diol may be used with about 1 equivalent of a di-acid, and preferably, between about 1.05 and 1.15 equivalents of diol with 1 equivalent of a di-acid may be used. In general, to ensure the formation of a hydroxy-group terminated polyester, a small excess of diol may be used.

In another embodiment, two moles of a diol are preferably transesterified with one mole of a methyl ester of a di-acid to yield a polyester of desired hydroxyl number.

Typical diols that may be used to form the polyester include, for example, butane diol, butyl ethyl propane diol, 2-methyl 1,3-propane diol, 1,3-propane diol, hexane diol, cyclohexane dimethanol, ethylene glycol, diethylene glycol, propylene glycol, dipropylene glycol, neopentyl glycol, hydroxypivalyl hydroxypivalate, and the like, or mixtures thereof.

Suitable and typical dicarboxylic acids or their corresponding alkyl esters that may be used to form the polyester include adipic acid, azelaic acid, sebacic acid, naphthalene dicarboxylic acid, dodecane dicarboxylic acid, cyclohexane dicarboxylic acid, hexahydrophthalic acid, phthalic acid, terephthalic acid, isophthalic acid, succinic acid, dimer fatty acid, or anhydrides of any of these acids.

Suitable isocyanates for use in the present invention include multi-functional (e.g., di-funtional, tri-functional, etc.) aliphatic, alicyclic or aromatic isocyanates. Preferred isocyanates have at least two (and more preferably exactly two) isocyanate groups in the molecule and are represented by the general formula

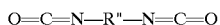

wherein R" preferably represents a divalent saturated aliphatic hydrocarbon group, saturated alicyclic hydrocarbon group, or aromatic hydrocarbon group, and may include a pendant carboxylic acid group.

Typical diisocyanates that may be used include aliphatic, aromatic or cycloaliphatic diisocyanates such as 1,6-hexamethylene diisocyanate, isophorone diisocyanate, 4,4'-biphenylene diisocyanate, toluene diisocyanate, cyclohexyl diisocyanate, tetramethyl xylylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, 4,4'-diisocyanatiodiphenyl ether, and the like. One presently preferred diisocyanate is isophorone diisocyanate.

Preferred coating compositions of the present invention may also incorporate a crosslinker. The crosslinker usable in the present invention is preferably present in an amount sufficient to cause crosslinking of the reactants within the desired time and temperature. Suitable crosslinkers include multifunctional blocked polyisocyanates; phenolics; amino resins; and the like. Typically useful blocking agents for the blocked polyisocyanates are any of those well known in the art such as alkylketoximes (e.g., methyl ethyl ketoxime), phenols, cyclic lactams, thiols, tertiary alcohols, secondary aromatic amines and dicarbonyl compounds (e.g., diethyl malonate). A presently preferred blocked polyisocyanate usable as the crosslinker is Vestanat B1358, available from Hüls Degussa.

Suitable and typical amino resins usable as crosslinkers in the present invention include formaldehydes, for example, melamine formaldehyde, urea formaldehyde, glycoluril formaldehyde, and benzoguanamine formaldehyde. A presently preferred amino resin crosslinker is benzoguanamine formaldehyde, available as Cymel 5010 from Cytec Industries of Patterson, N.J.

For coating compositions, the crosslinker is suitably present in the amount up to about 25 weight percent, more preferably about 1 and 20 weight percent, and most preferably between about 5 and 15 weight percent of the total coating composition.

Preferably, the coating composition of the present invention may comprise a catalyst. The catalysts may be used in an amount sufficient to enhance the reaction between the crosslinker and the PE-PU polymer of the present invention. Suitable catalysts include acids, amines, and metal salts. Preferred catalysts include heat-activated catalysts such as phosphoric acid, dibutylin dilaurate, p-toluene sulfonic acid, and dodecylbenzene sulfonic acid (DDBSA). A presently preferred catalyst is DDBSA available as Cycat 600 from Cytec Industries of Patterson, N.J.

Suitable amines and metal salts usable as catalyst in the present invention include tertiary and quaternary amines, and octoates (e.g., zirconium octoate, and zinc octoate). The amount of catalyst present in the present invention is typically less than about 2 weight percent, more typically less than about 1 weight percent, and most typically less than 0.5 weight percent of the total resin solids of the coating composition.

The coating composition of the present invention may optionally include one or more lubricants. Lubricants may be used for one or more of the following effects, including but not limited to: improving ease of handling of the coated substrate; enhancing scuff resistance; or improving fabrication capabilities. Suitable lubricants usable in the present invention include, for example, polyethylene, polytetrafluroethane (PTFE), and natural lubricants such as Carnauba wax, available from Michelman Lubricants of Cincinnati, Ohio. Typical amount of lubricants usable in the present invention depend upon specific application, and preferably up to about 2 weight percent, more preferably between about 0.1 and 1.5 weight percent, and most preferably between about 0.5 and 1.5 weight percent of the coating composition.

The coating composition of the present invention may also include pigments. Pigments are preferably used to give the coating composition the required finish on the packaging. Suitable pigments in this invention are present in the amount sufficient to give the desired opacity, finish texture, and/or general aesthetic quality to the coated substrate. Suitable pigments include aluminum oxides, titanium oxides, zinc oxides, and the like. An example of a pigment usable in the present invention is Ti-Pure R-900 available from E. I. duPont de Nemours of Wilmington, Del. Typical amount of pigments usable in the present invention depends on intended finish and is preferably less than about 30 weight percent of the coating composition.

In an embodiment of the present invention, a rheological or flow control agent may preferably be incorporated into the coating composition. The rheological or flow control agents of the present invention provide the coating composition of the present invention with improved ability to uniformly coat when applied to a substrate. Suitable rheological or flow control agents include acrylics, silicones, waxes, fluoro-surfactants, and the like. A presently preferred rheological and flow control agent usable in the present invention is BYK-Series silicone, available from BYK Chemie of Bad Homburg, Germany. Preferred rheological and flow control agents are usable in the amount of less than 1 weight percent, more preferably less than about 0.5 weight percent of the coating composition.

The coating composition of the present invention may comprise an optional carrier. The optional carrier of the present invention provides a vehicle for facilitating the delivery of the coating composition to the intended substrate. Preferably, the carrier of the present invention is present in the amount sufficient to produce a uniform, blister-free coating. The carrier of the present invention may preferably be removable by heat (and/or vacuum stripping), e.g., during the curing process. Suitable carriers for the coating composition of the present invention include water, and other organic solvents such as alcohols, ketones, esters, aromatic and aliphatic hydrocarbons. Examples of suitable organic solvents include xylene, toluene, methyl ethyl ketone, methyl amyl ketone, methyl isobutyl ketone, dibasic ester, propylene carbonate, N-methyl pyrrolidone and the like. The amount of carrier used in the present invention is preferably between up to about 80 weight percent, more preferably between about 10 and 70 weight percent, and most preferably between about 10 and 50 weight percent of the coating composition.

The benefits of the coating composition of the present invention include one or more of the following: a) ease of application; b) high solids content c) uniform appearance over a variety of substrates; d) chemical stability; e) solvent selection; f) ability to accept pigments; g) ability to allow coated package formation without loss of coating integrity; h) corrosion resistance; i) and sterilization resistance. The coating composition of the present invention provides an environmentally friendly product that is substantially free of vinyl components.

Preferably, the coating composition of the present invention is usable to coat a packaging substrate by a variety of methods. These methods include sheet coating, coil coating, and spray coating. Typically, the packaging substrate is preferably a flat metal substrate prior to coating. The coated flat metal substrate may then be fed through an oven to volatize the solvents and activate any desired crosslinking. The coated substrate may then be formed into a package (or a portion of a package), e.g., by stamping, drawing, machining, or by any other process as is known in the art, and welding the edges if so required.

A method of sheet coating may be by direct roll coating flat sheets of metal, typically about 1 $m^2$. These coated sheets of metal may then be fed through a forced draft, gas-fired oven for about 8 to 15 minutes at peak metal temperatures (PMT) of between about 175 and 230° C. Other sheet coating processes are usable and may depend on the equipment and processing capabilities.

A suitable coil coating process preferably includes application by reverse roll-coating onto a continuous metal coil. The continuous metal coil may then be fed through a high-velocity, gas-fired oven for about 9 to 60 seconds at peak metal temperatures (PMT) of between about 215 and 260° C.

Spray coating involves the introduction of the coated composition into a preformed packaging container. Typical preformed packaging containers may include food cans, beer and beverage cans, cartons, drug bottles and packages, and the like. The spray coating process preferably utilizes an airless or air-assisted spray nozzle that is capable of uniformly coating the inside of the preformed packaging container. The coated container may then be subjected to heat to remove any residual solvent, cure and/or crosslink the coating. Typically, the coated container is subjected to a gas-fired oven for about 2 to 6 seconds at a peak metal temperature of between about 200 and 235° C.

Suitable metal substrates for use in the present invention include: cleaned and pretreated aluminum; tin-free steel (TFS); and electrolytic tin plate (ETP).

For rigid packaging purposes, the coating thickness of the present invention typically ranges between about 2 and 10 microns or between about 0.3 and 1.5 milligrams per square centimeter. Rigid packaging materials usable in the present invention include metals (e.g., aluminum), glass, and plastics.

The coating composition of the present invention may be used to coat the interior or exterior portions of a packaging substrate. The coating of the present invention is preferably flexible enough that a flat coated sheet may be fabricated into a package (or a portion of a package) without cracking, peeling, or otherwise causing the exposure of an uncoated metal substrate. The packaging substrate includes substrates usable for beverage cans, food cans, and the like. These cans comprise different sizes, types and styles. Fabrication of the cans may include folding the coated flat substrate into a cylinder and welding the edges. Ends are then attached to the top and bottom of the folded cylinder. Other fabrication processes include forming a cup or recessed-plate from a flat substrate by stamping, drawing, machining, or by any other process as is known in the art, and welding the edges. An end is then sealed onto the top. A typical food can is usable to package sardines, tuna, and the like. These food cans are sometimes labeled as Draw and Ironed (D & I) or Draw-Redraw (DRD) cans.

TEST METHODS

Adhesion

Adhesion testing was performed to assess whether the coating adheres to the metal substrate. The adhesion test was performed according to ASTM D 3359—Test Method B, using a Scotch™ 610 tape, available from Minnesota Mining and Manufacturing (3M) Company of Saint Paul, Minn.
Solvent Resistance The cure of a coating is measured as a resistance to solvents, such as Methyl Ethyl Ketone (MEK), or Acetone. This test was accomplished as described in ASTM D 5402-93. The number of double rubs (i.e., one back-and-forth motion) is recorded.

Blush Resistance

Blush resistance measures the ability of a coating to resist attack by various solutions. Typically, it is measured by the amount of water absorbed into a coating. When the coated substrate absorbs water, it is generally cloudy or looks white.

Sterilization or Pasteurization

The sterilization or pasteurization test determines how a coating withstands the processing conditions for different types of food packaged in the container. Typically, a coated substrate is immersed in a water bath and heated to between 65 and 100° C. for about 15 to 60 minutes. The coated substrate is then removed from the water bath and tested for coating adhesion and blush.

Process or Retort Resistance

This is measure of the decomposition of the coated substrate using heat and pressure. The procedure is similar to Sterilization or Pasteurization test (above) except that the testing is accomplished by subjecting the container to heat of between about 105 and 130° C.; pressure of between about 0.7 to 1.0 kg/cm$^2$; and for about 15 to 90 minutes. The coating is then tested for adhesion and blush.

Corrosion Resistance

This test is a measure of the ability of the container to resist corrosion when exposed to food or beverage. This test is similar to the Process or Retort Resistance test above, except that it uses food, beverage or food/beverage simulators instead of water. These simulators may include 3% acetic acid, 1% lactic acid, 1% citric acid, and the like. The coated substrate is then evaluated for adhesion and blush.

Fabrication

This test measures the ability of the coated container to retain its integrity as it undergoes the formation process necessary to produce a coated container. It is a measure of the presence or absence of cracks or fractures in the coated container. A coated container is typically filled with electrolyte solution are tested for amount of electrical current that can pass through the container. If the coating remains intact (no cracks or fractures) after fabrication, no current will pass through the container.

EXAMPLES

The following examples are offered to aid in understanding of the present invention and are not to be construed as limiting the scope thereof. Unless otherwise indicated, all parts and percentages are by weight.

Example 1

Preparation of Polyester Prepolymer

In a suitably equipped 4-neck flask with stirrer, thermometer, packed column, water condenser, and a nitrogen inlet were charged Neopentyl glycol 905.9 g. (4.67 moles), Ethylene glycol 704.5 g. (11.363 moles), Cyclohexane dimethanol 346.1 g. (2.403 moles), Dimethyl Terephthalate 905.9 g. (4.67 moles), Dimethyl Isophthalate 743.02 g. (3.87 moles), and Tyzor TOT 0.5 g. (Tetraoctyl Titanate, DuPont). The batch was heated slowly under nitrogen to 215° C., while continuously distilling off the methanol formed during the reaction. After approximately 410 g. methanol was collected the batch was cooled. The resultant polyester prepolymer had the hydroxy number of 379.

Example 2

Preparation of Polyester Intermediate

In a suitably equipped 4-neck flask with stirrer, thermometer, water condenser, and a vacuum outlet were charged the above prepolymer of Example 1. The flask was heated under reduced pressure (75–80 mm.) to 234° C., while continuously distilling out ethylene glycol with small amounts of Neopentyl glycol. When formation of glycol slowed down, the batch was cooled. The polyester intermediate was a solid. Tg. 48.3, Mw=5250, Mn=2160, and OH#=56.

Example 3

Preparation of Polyester Polyurethane

In a three-neck flask with stirrer, condenser and a nitrogen inlet were charged 200 g. (200 meq of OH) of the polyester intermediate of Example 2 and 300 g. of Dowanol PM Acetate. The mixture was heated to 70° C. till a clear solution. To this solution at 70° C. were added 21.5 g, (193 meq. of NCO groups) of Isophorone diisocyanate, and 0.2 g. of dibutyltin dilaurate catalyst. The batch temperature was maintained at 70° C. for 7 hours. IR spectroscopy showed the absence of —NCO groups. The batch was cooled to room temperature. The resultant polyester polyurethane had the following characteristics. Solids=42.5%, Mw=28210, Mn=6740, Mw/Mn=4.2, OH#=3.

Example 4

Preparation of Polyester Polyurethane

In a three-neck flask with stirrer, condenser and a nitrogen inlet were charged 800 g. (800 meq of OH) of the polyester intermediate of Example 2, 240 g. of Dowanol PM Acetate, 240 g. of Dibasic Ester, 240 g. of Butyl Cellosolve Acetate, 240 g of Aromatic 100 and 240 g. of Aromatic 150. The mixture was heated to 70° C. till a clear solution. To this solution at 70° C. were added 86.0 g, (772 meq. of NCO groups) of Isophorone diisocyanate, and 0.8 g. of dibutyltin dilaurate catalyst. The batch temperature was maintained at 70° C. for 7 hours. IR spectroscopy showed the absence of —NCO groups. The batch was cooled to room temperature. The resultant polyester polyurethane had the following characteristics. Solids=42.6%, Mw=26210, Mn=9040, Mw/Mn=2.9, OH#=4.

Example 5

Preparation of Polyester Intermediate

In a suitably equipped reactor with stirrer, thermometer, water condenser, and a vacuum outlet were charged the prepolymer of Example 1. The reactor was heated under reduced pressure (2 mm.) to 260° C., while continuously distilling out ethylene glycol with small amounts of Neopentyl glycol. When formation of glycol slowed down, the batch was cooled. The polyester intermediate was a solid. Tg. 51° C., Mw=10760, Mn=4020, and OH#=28.

Example 6

Preparation of Polyester Polyurethane

In a three-neck flask with stirrer, condenser and a nitrogen inlet were charged 200 g. (100 meq of OH) of the polyester intermediate of Example 5 and 300 g. of Dowanol PM Acetate. The mixture was heated to 95° C. till a clear solution. To this solution at 70° C. were added 11.0 g, (100 meq. Of NCO groups) of Isophorone diisocyanate, and 0.2 g. of dibutyltin dilaurate catalyst. The batch temperature was maintained at 70° C. for 28 hours. IR spectroscopy showed trace amounts of residual —NCO groups. The batch was cooled to room temperature. The resultant polyester polyurethane had the following characteristics. Solids=42.5%, Mw=25980, Mn=8550, Mw/Mn=3.0, and OH#=1.

Example 7

Preparation of Polyester Polyurethane

In a three-neck flask with stirrer, condenser and a nitrogen inlet were charged 800 g. (400 meq of OH) of the polyester intermediate of Example 5, 240 g. of Dowanol PM Acetate, 240 g. of Dibasic Ester, 240 g. of Butyl Cellosolve Acetate, 240 g of Aromatic 100 and 240 g. of Aromatic 150. The mixture was heated to 70° C. till a clear solution. To this solution at 70° C. were added 44.0 g, (400 meq. of NCO groups) of Isophorone diisocyanate, and 0.8 g. of dibutyltin dilaurate catalyst. The batch temperature was maintained at 70° C. for 8 hours. IR spectroscopy showed trace amounts of residual —NCO groups. The batch was cooled to room temperature. The resultant polyester polyurethane had the following characteristics. Solids=39.6%, Mw=25950, Mn=9470, Mw/Mn=2.7, OH#=1.

Examples 8 and 9

Interior Food Can Lining

Control A is an aluminized interior food can lining based on Dynapol L 952 polyester with the following composition: 62.979% Dynapol L 952 polyester dissolved at 40% in 1/1/1/1/1 Dibasic Ester, Aromatic 100, Aromatic 150, Butyl Cellosolve Acetate and Dowanol PM Acetate; 4.173% Vestanat B 1358, (from Huls) an IPDI trimer, blocked isocyanate with MEK oxime dissolved at 63% in Aromatic 100; 0.149% Fascat 4102 tin catalyst; 4.838% aluminum paste; 2.864% polyethylene lubricant; 0.946% CAB 551 cellulose acetate butyrate; 11.721% Aromatic 100 and 12.330% Dowanol PM Acetate.

Example 8 can lining was prepared as described for Control A with the polyurethane of Example 4 replacing the Dynapol L 952 ingredient.

Example 9 can lining was prepared as described for Control A with the polyurethane of Example 7 replacing the Dynapol L 952 ingredient.

Samples were coated under both sheet and coil conditions over 75# tin-free steel (TFS) and 0.25 75# tinplate (ETP). Coated panels were evaluated for cure, DRD can fabrication and basic food can corrosion resistance properties. The coated sheets were cured for 12 seconds at 204° C. in a gas-fired, forced-draft oven; and the coated coils were cured for 16 seconds at 249° C. in a gas-fired high air velocity coil oven followed by a water quench.

The test conditions for water and simulators were as follows:
Process Water Retort: Deionized Water for 90 minutes at 121° C., 1.05 kg/cm².
Lactic Acid Retort: 1% lactic acid for 60 minutes at 121° C., 1.05 kg/cm².
Salt/Acetic Acid Retort: 2% NaCl/1% Glacial Acetic acid for 60 minutes at 121° C., 1.05 kg/cm².

Although the Example 8 and 9 systems did show a somewhat greater tendency to blush, the overall performance of these systems was generally comparable to the polyester-based control.

Tables 8–9(a) and 8–9(b) summarize the test results:

TABLE 8-9(a)

| | COIL BAKE | | | | | |
|---|---|---|---|---|---|---|
| | Control A | | Example 8 | | Example 9 | |
| | ETP | TFS | ETP | TFS | ETP | TFS |
| MEK DR | 5 | 5 | 5 | 5 | 5 | 5 |
| 202 × 200 Can Fabrication | Good | Good | Good | Good | Good | Good |
| Adhesion | | | | | | |
| Water Retort | 10 | 10 | 10 | 10 | 10 | 10 |
| Lactic Acid Retort | 10 | 10 | 10 | 10 | 10 | 10 |
| Salt/Acetic Acid Retort | 10 | 10 | 2 | 10 | 8 | 10 |
| Blush Resistance | | | | | | |
| Water Retort | 9 | 9 | 10 | 10 | 5 | 8 |
| Lactic Acid Retort | 0 | 0 | 2 | 0 | 0 | 0 |
| Salt/Acetic Acid Retort | 8 | 0 | 2 | 0 | 5 | 0 |
| Corrosion Resistance | | | | | | |
| Lactic Acid Retort | 10 | 10 | 10 | 10 | 10 | 10 |
| Salt/Acetic Acid Retort | 10 | 5 | 5 | 5 | 10 | 5 |

Rating scale used: 0 to 10, where "0" is a complete failure and "10" is no failure. Results are shown for the test regimen. For the Blush Resistance test, a rating of "9" would indicate that 90% of the coating remained free of blush defect. For the Adhesion test, a rating of "7" would indicate that 70% of the can remained adhered, and rating of "10" indicates no failure due to adhesion. For the Corrosion Resistance test, a rating of "5" would indicate that 50% of the can remained free of corrosion defect.

TABLE 8-9(b)

| | SHEET BAKE | | | | | |
|---|---|---|---|---|---|---|
| | Control A | | Example 8 | | Example 9 | |
| | ETP | TFS | ETP | TFS | ETP | TFS |
| MEK DR | 25 | 25 | 25 | 25 | 25 | 25 |
| 202 × 200 Can Fabrication | Good | Good | Good | Good | Good | Good |
| Adhesion | | | | | | |
| Water Retort | 10 | 10 | 10 | 10 | 10 | 10 |
| Lactic Acid Retort | 10 | 10 | 10 | 10 | 10 | 10 |
| Salt/Acetic Acid Retort | 10 | 10 | 9 | 10 | 10 | 10 |
| Blush Resistance | | | | | | |
| Water Retort | 10 | 9 | 7 | 7 | 9 | 9 |
| Lactic Acid Retort | 0 | 0 | 2 | 0 | 0 | 0 |
| Salt/Acetic Acid Retort | 10 | 0 | 10 | 0 | 9 | 0 |
| Corrosion Resistance | | | | | | |
| Lactic Acid Retort | 10 | 10 | 10 | 10 | 10 | 10 |
| Salt/Acetic Acid Retort | 10 | 5 | 10 | 5 | 10 | 5 |

Example 10

Interior of Beer/Beverage Ends

The following crosslinkers were added to Dynapol L 952 polyester, the polyurethane of Example 4 and the polyurethane of Example 7 at 5% solids of polymer solids: Cymel 303, Cymel 1156, Cymel 325 (melamine formaldehyde), Cymel 370, Cymel 1125 (benzoguanamine formaldehyde), Beetle 1052-8 (urea formaldehyde) and Vestanat B 1358 (blocked isocyanate). Samples with amino crosslinkers were catalyzed with Cycat 600 (DDBSA) at 5% by weight of crosslinker solids. Vestanat B 1358 blocked isocyanate was catalyzed with dibutyltin dilaurate at 5% by weight on crosslinker solids. All samples were cured for 1 minute at 400° F. (204° C.) in a forced draft box oven over chrome treated aluminum. Panels were evaluated for coating cure, can fabrication and basic beverage end corrosion resistance properties. No significant coating cure was observed with the polyester-based systems. Subsequently, corrosion resistance of these films was evaluated as fair. Varying degrees of coating cure were observed with all polyurethane-based systems with the exception of those utilizing Beetle 1052-8 as the crosslinker. Corrosion resistance of the systems that showed cure was generally good to excellent.

Example 11

Coating Composition

An aluminized interior food can lining (e.g., useful for the interior of cans) was formulated having:

TABLE 11(a)

Coating Composition

| Ingredient | Parts by Weight |
| --- | --- |
| Polyester of Example 7 | 64.7 |
| Cymel 5010 benzoguanamine crosslinking resin | 5.8 |
| Kukdo 1002 epoxy resin dissolved at 50% in MEK | 5.8 |
| Aluminum paste | 2.6 |
| Phosphoric acid dissolved at 10% in isopropanol | 1.3 |
| Cycat 600 (DDBSA) acid catalyst dissolved at 10% in isopropanol | 0.6 |
| Synthetic paraffin lubricant | 0.8 |
| Dibasic Ester solvent | 12.9 |
| MEK solvent | 3.0 |
| Dowanol PM Acetate solvent | 2.5 |

The above composition may be applied (e.g., by reverse-roll coating application) over 75# tin-free steel (TFS) and may be baked for 15–20 seconds to a peak metal temperature (PMT) of 250 to 260° C. (480–500° F.) in a high velocity, gas fired coil oven. In laboratory tests, the composition is applied using a stainless steel, wire wound applicator (barcoater). Lab bake conditions are the same as commercial conditions. Typical dry film thickness would be 8–10 milligrams/square inch (MSI) (1.24 to 1.55 mg/cm$^2$).

Dry films were evaluated for cure (MEK Resistance), draw-redraw (DRD) can fabrication, water retort resistance, resistance to tuna (staining, adhesion, corrosion) and resistance to salmon (staining, adhesion, corrosion). Tuna resistance is measured after packing cans with tuna and retorting 90 minutes at 121° C. (250° F.) at 103.4 kPa (15 psi). Salmon resistance is measured after packing cans with salmon, retorting 60 minutes at 121° C. (250° F.) at 103.4 kPa (15 psi) and storing cans for one week at 49° C. (120° F.).

Performance of the polyurethane-based system was comparable to PVC and epoxy-based controls.

Example 12

Preparation of Polyester Polyurethane with Pendant —COOH Groups

In a three-neck flask with stirrer, condenser and a nitrogen inlet were charged 200 g. (100 meq of OH) of the polyester intermediate of Example 5 and 280 g. of Dowanol PM Acetate. The mixture was heated to 95° C. till a clear solution. To this solution at 70° C. were added 6.6 g (98 meq of OH) of dimethyl propionic acid dissolved in 20 g. of N-methyl pyrrolidone and 22.0 g. (198 meq. of NCO groups) of Isophorone diisocyanate, and 0.2 g. of dibutyltin dilaurate catalyst. The batch temperature was maintained at 70° C. for 5 hours. IR spectroscopy showed trace amounts of unreacted —NCO groups. The batch was cooled to room temperature. The resultant polyester polyurethane had the following characteristics. Solids=43%, Mw=13420, Mn=3780, Mw/Mn=3.55, OH#4.8.

Example 13

Preparation of IPDI-DMPA Adduct

In a three-neck flask with stirrer, condenser and a nitrogen inlet were charged 100 g. of N-methyl pyrrolidone, 40.2 g. (0.3 moles) of Dimethyl propionic acid, and 0.2 g. of dibutylin dilaurate. To this solution at 25° C. was added 133.2 g, (0.6 moles) of IPDI through a dropping funnel. After all the IPDI was charged, the funnel was rinsed with 10 g. of N-methyl pyrrolidone into the flask. The reaction mixture was heated slowly to 60° C. for 4 hours. The resultant product had the following characteristics. Solids 42.6%, NCO content =8.3% (calculated=8.87%), and Acid#=55 (calculated 57) at 42.6% solids.

Example 14

Preparation of Polyester Polyurethane with pendent —COOH Groups

In a three-neck flask with stirrer, condenser and a nitrogen inlet were charged 200 g. (100 meq of OH) of the polyester intermediate of Example 5, and 250 g. of N-methyl pyrrolidone. To this solution were added 50.6 g (100 meq of NCO) of the IPDI-DPMA adduct of Example 13. The mixture was heated to 95° C. and the temperature maintained for 4 hours. IR spectroscopy showed trace amounts of residual —NCO in the product. The temperature of the batch was maintained at 70° C. for an additional 3 hours. The resultant product had the following characteristics. Solids=46%, Mw=15130, Mn=5130, Mw/Mn=2.95.

Having thus described the preferred embodiments of the present invention, those of skill in the art will readily appreciate that the teachings found herein may be applied to yet other embodiments within the scope of the claims hereto attached.

What is claimed is:

1. A method of coating a packaging container, comprising the steps of:
   providing a coating composition having
      a crosslinkable polyester-polyurethane polymer with at least two carbamate sites; and
      a crosslinker;
   coating the composition onto a generally planar substrate;
   curing the composition; and
   forming the substrate into a container or a portion of a container.

2. The method of claim 1, wherein the crosslinkable polyester-polyurethane polymer is formed from the reaction of a polyester intermediate and a polyisocyanate compound.

3. The method of claim 1, wherein the crosslinkable polyester-polyurethane polymer has number average molecular weight of between about 5,000 and 35,000.

4. The method of claim 1, wherein the crosslinkable polyester-polyurethane polymer has a glass transition temperature of between about 50° C. and 80° C.

5. The method of claim 1, wherein the crosslinkable polyester-polyurethane polymer is a reaction product of hydroxy functional polyester and a polyisocyanate compound.

6. The method of claim 5, wherein the hydroxy functional polyester is a reaction product of a diol having between 2 and 12 carbon atoms and a dicarboxylic acid having between 4 and 40 carbon atoms.

7. The method of claim 5, wherein the hydroxy functional polyester has a number average molecular weight of between about 2,000 and 10,000.

8. The method of claim 6, wherein the diol is selected from the group consisting of butane diol, butyl ethyl propane diol, 2-methyl 1,3-propane diol, 1,3-propane diol, hexane diol, cyclohexane dimethanol, ethylene glycol, diethylene glycol, propylene glycol, dipropylene glycol, neopentyl glycol, and hydroxypivalyl hydroxypivalate.

9. The method of claim 6, wherein the dicarboxylic acid is selected from the group consisting of adipic acid, azelaic acid, sebacic acid, naphthalene dicarboxylic acid, dodecane dicarboxylic acid, cyclohexane dicarboxylic acid, hexahydrophthalic acid, phthalic acid, terephthalic acid, isophthalic acid, succinic acid, dimer fatty acid, esters of dicarboxylic acid, and anhydrides thereof.

10. The method of claim 5, wherein the polyisocyanate compound is selected from the group consisting of 1,6-hexamethylene diisocyanate, isophorone diisocyanate, 4,4'-biphenylene diisocyanate, toluene diisocyanate, cyclohexyl diisocyanate, tetramethyl xylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis-(4-isocyanatocyclohexyl)-methane, and 4,4'-diisocyanatiodiphenyl ether.

11. The method of claim 1, wherein the crosslinker is selected from the group consisting of blocked polyisocyanates, phenolics, and amino resins.

12. The method of claim 1, wherein the coating composition comprises about 50 to 100 weight percent crosslinkable polyester-polyurethane polymer.

13. The method of claim 1, wherein the coating composition comprises about 70 to 95 weight percent crosslinkable polyester-polyurethane polymer.

14. The method of claim 1, wherein the coating composition comprises up to about 25 weight percent crosslinker.

15. The method of claim 1, wherein the coating composition comprises about 5 to 15 weight percent crosslinker.

16. The method of claim 1, wherein the coating composition further comprises an adjuvant selected from the group consisting of carriers, lubricants, pigments, rheological control agents, and flow control agents.

17. The method of claim 1, wherein the coating composition further comprises at least one carrier.

18. The method of claim 1, wherein the coating step is selected from the group consisting of sheet coating, coil coating and spray coating.

19. The method of claim 1, wherein the curing step comprises heating to the coated substrate.

20. The method of claim 1, wherein the thickness of the cured coating is between about 2 and 10 microns.

21. The method of claim 1, wherein the coated substrate is selected from the group consisting of: cleaned and pre-treated aluminum; tin-free steel; electrolytic tin plate; drug bottles; drug packages; and cardboard.

22. The method of claim 1, wherein the coating on the formed container is substantially free of cracks, peels, exposed non-coated substrate, or combinations thereof.

23. The method of claim 1, wherein the coated container is formed by stamping, drawing, machining, welding or combinations thereof.

24. The method of claim 1, wherein the coated substrate is formed into a Draw-Redraw can.

* * * * *